United States Patent Office 2,872,964
Patented Feb. 10, 1959

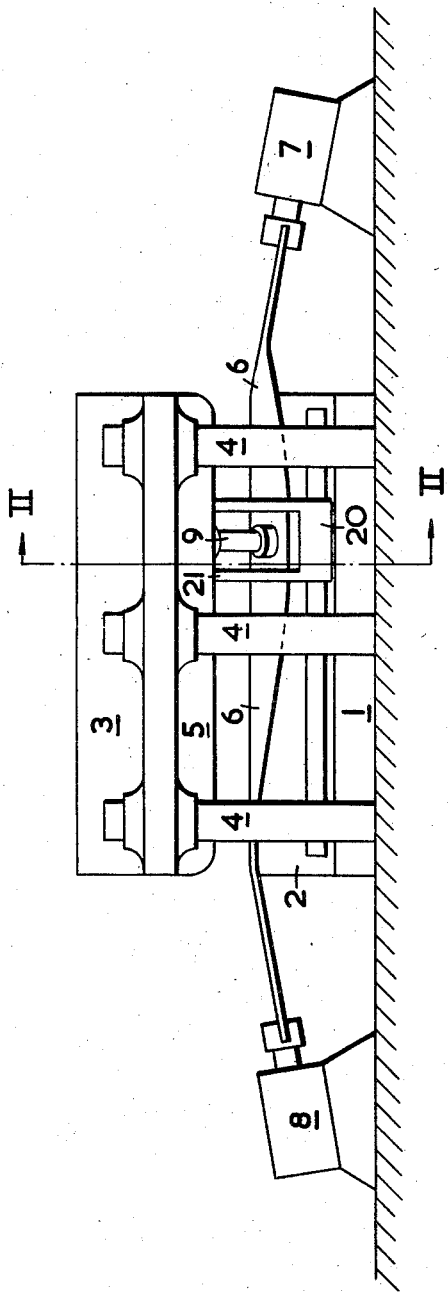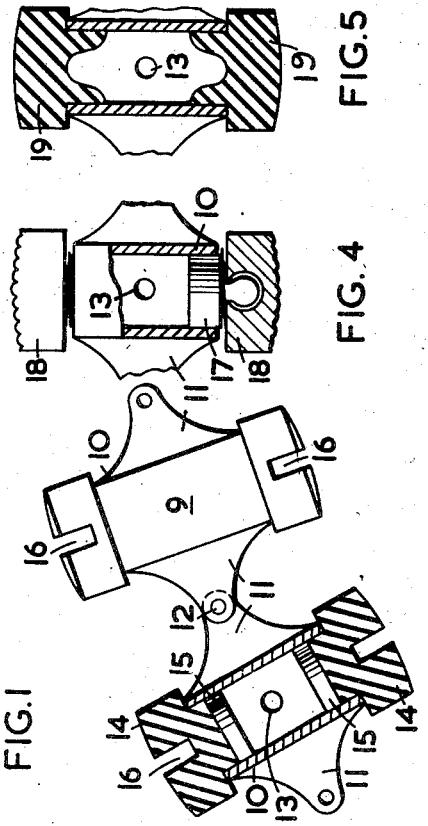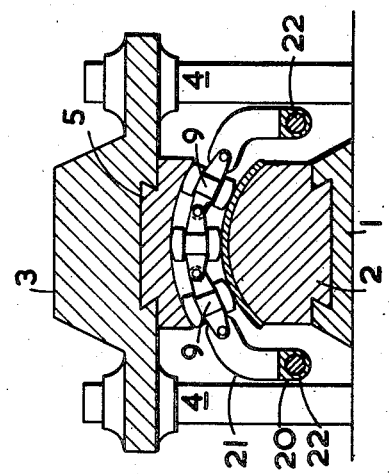

2,872,964

FORMING BLOCK WITH SHIFTABLE CLAMPING ELEMENT FOR APPARATUS FOR WORKING METAL STOCK

William Stephen Hollis, Banstead, England, assignor to National Research Development Corporation, London, England, a British corporation Application November 1, 1955, Serial No. 544,234

Claims priority, application Great Britain November 3, 1954

5 Claims. (Cl. 153—48)

This invention relates to the stretch forming of components from aluminium alloy and other metal stock having similar working characteristics, the said stock being in the form of sheets or slabs with a cross-sectional area varying along the length thereof. The stock may consist of sheets or slabs of uniform width throughout the length thereof, for example, rectangular sheets, but tapering in thickness, or of sheets or slabs tapering in width but of uniform thickness. Or again the stock may taper in both width and thickness. Moreover, the stock may consist of sheets or slabs with plain surfaces or may have ribs and like projecting features on one or both surfaces.

According to the present invention, stock of the kind specified above, the cross-sectional area of which varies progressively along a given dimension, is clamped progressively in one or other direction along said dimension and stretched, in a manner such that substantially the same extent of elongation shall take place at all points, irrespective of cross-sectional area, the means whereby said clamping is effected also shaping the stock during the action of clamping.

The part of the metal stock which is of the smaller cross-sectional area and is situated at one end of the dimension along which stretching is to take place may be held in a clamp and the other part of the metal stock which is of the larger cross-sectional area at the other end of the said dimension may be connected to means between which and said clamp stretching is to be effected, whereby said smaller cross-sectional area part of the metal stock may be stretched when the aforementioned forming means which progressively clamps the metal is out of clamping engagement with the latter.

A machine for carrying the invention into effect may comprise a pair of clamps between which relative movement takes place to stretch the metal stock, one of which clamps holds the metal stock at one end of the dimension to be stretched. The second clamp clamps the metal stock progressively along the said dimension and includes a body having a surface conforming to the contour required for the finished component and constituting a former block, and a second block having a complementary surface, although not necessarily a mating one, which second block co-operates, either directly or indirectly, with the former block, in order that the metal stock shall be shaped on the contoured surface of the former block during the clamping action of said second clamp. Preferably a third clamp is provided for holding the metal at the opposite end of the dimension to be stretched to that which is held by the first clamp, so that one stretch can be effected directly between said first and third clamps without the second clamp being in operation, this having the advantage that in the case of a piece of metal stock requiring to be stretched practically from end to end this can be effected with little or no waste.

If desired, instead of the second block directly shaping the metal upon the former block, suitable means may be interposed between the second block and the metal upon the former block for doing this, such means for example comprising one or more jacks, in which latter case the second block would constitute a thrust block to take the thrust of said jacks during the shaping of the metal and to enable said jacks to maintain said metal firmly clamped during stretching. The jacks may be hydraulically operated and connected to a source of fluid pressure through flexible hoses.

The jacks may be linked together to form an articulated clamping device which may be constrained to form any determined sinuous geometry as required by the former and holder blocks at the section at which the clamping device is placed. This articulated structure also assists the jacks to adjust themselves to the varying geometry of the former and second blocks as the said jacks are moved lengthwise along the stock. Details of the jacks are described hereinafter.

This arrangement may be used in the following manner:

The stock is arranged between the former and second blocks with the first clamp connected to the end of the stock having the maximum cross-sectional area and the other end to the third clamp and, while the second clamp is out of clamping engagement with the metal, a tensile stress is applied by causing relative movement between said first and third clamps, this tensile stress amounting to about 2 percent above the elastic limit of the metal at the smaller cross-sectional end. The stock is then formed upon and clamped to the former block. Thereupon the stretching tension is increased to create the required tensile stress in the slightly stronger section of the material in front of the section clamped by the combined forming and clamping device. The stretching tension is then eased at least to its starting magnitude and the clamping device shifted to clamp and shape the stock at the section which has just been stressed above the elastic limit. The steps of the process are then repeated until the stock has been stretched and formed over its entire length.

Instead of employing a single means for shaping and clamping the material and inching this means along the material, a number of such means may be employed, one for each section of the stock which is successively stressed. In this case the stretching tension need never be eased, the combined shaping and clamping means being operated to come into effect successively as the stretching tension is increased. Safety means may be provided for interlocking the combined forming and clamping means with the tensioning means so that no stretching tension above that necessary to stretch the portion of the stock which is of the smallest cross-sectional area can be applied until the clamping pressure has been effectively applied by said forming and clamping means.

Furthermore the pressure supplied to the clamping device may be arranged to pulsate so that a carrier containing the device can slide progressively along the stock, locating and clamping the said stock in advance of the application of the tensile stress appropriate to the clamping postion. To this end the pulsations in the jacks and tensioning means may correspond in frequency but not in phase, since the clamping pressure must be effective throughout the building up of the tensile stress to stretch the sheet and its return to its minimum.

In an alternative method of carrying out the invention, the former and second blocks may be arranged to move relatively to one another in the manner of the jaws of a press and may exert a clamping and forming pressure on the stock through the intermediary of a series of spacing blocks arranged between said former and second block. The spacing blocks may be in the form of pads or strips of tough, resilient material or in the form of metal blocks preferably associated with resilient or spring means. As the forming process proceeds the spacing blocks are shifted step by step along the stock in the manner previously described in the case where the jacks are employed. In this method also interlocking may be employed between the stretching means and clamping means.

In still another method of carrying out the invention, which may be suitably employed for relatively light and narrow stock, the said stock while under tension is shaped by complementary former blocks which perform as rollers. For example, for forming an elongated transversely curved component from flat strip of tapering thickness, one former may consist of an elongated block with a pressure surface which is concave in cross-section whilst the other block consists of a quadrantal member or roller the arcuate surface or circumference of which is convex in cross-section and is capable of rolling within the concave pressure surface of the other block to generate the required form. For forming transversely curved components the curvature of which varies progressively from one end to the other, blocks may be used having pressure surfaces with correspondingly progressively varying shape. In this method of carrying out the invention the clamping and shaping roller blocks may operate progressively and uninterruptedly as the longitudinal tension is increased, the point of anchorage for example moving progressively from the weaker end of the stock towards the stronger end.

One form of the invention and a suitable way of carrying the same into effect will now be described by way of example, with reference to the diagrammatic drawings accompanying the specification, in which:

Figure 1 is a side view of a complete stretch forming arrangement,

Figure 2 is a sectional view on the line II—II, Figure 1, looking in the direction of the arrows.

Figure 3 shows one form of construction of the jacks which may be used for clamping the stock and Figures 4 and 5 show alternative forms of the jacks.

In Figure 1, the arrangement, comprises a rigid base member 1 on which is mounted a former block 2. A rigid member 3 supported by pillars or tie rods 4 carries a second block 5, at a distance above the former block 2. The stock 6 is clamped at its weaker end to a ram 7 and at its stronger end to another ram 8.

The stock 6, initially in the form of a flat sheet, is applied to the former block 2 and the ram 8 is operated to apply a tensile stress to the stock of such magnitude that the material at the weaker end, that is, the end nearest the ram 7, is stressed to about 2 percent above the elastic limit of the material. Thereafter a series of fluid operated jacks 9 is inserted beneath the second block 5 at the end nearest the ram 7 and these jacks are operated to clamp and form the stock upon the former block 2, as shown in Figure 2, at successive parts along the stock in a direction toward the ram 8, and, each time the stock is clamped at one of these successive parts, a successive stretch is applied by the ram 8. In the arrangement shown in the drawings the series of jacks is so arranged that it can be pushed manually along into a position to be brought into operation upon a successive part of the stock each time the fluid pressure has been relieved after the completion of the preceeding forming and stretching operation.

The jacks are more clearly shown in Figures 2 and 3. Each of the jacks forms part of a series of double acting hydraulic jacks 9, the cylindrical bodies 10 (Fig. 3) of which are formed with wings 11, with a wing on one jack pivotally connected as at 12 to a wing of an adjacent jack to form an articulated structure. The jacks are hydraulically operated, each jack having an individual supply pipe (not shown) communicating with a common source of fluid pressure, each supply pipe being connected to a part 13 at the middle of each cylinder 10.

Various forms of jacks may be provided. In the form shown in Figure 3, the said cylindrical body 10 is closed at each end by a head 14 of tough, resilient material such as rubber, the heads 14 having piston-like extensions extending into the cylinder 10 and engaging steel piston 15 which receive the pressure of the hydraulic medium. The resilience of the rubber heads 14 permits the jacks to conform to the contour of the blocks 2 and 5 and enables the stock to be formed closely in contact with the former block 5. The heads 14 may be moulded with channels 16 to accommodate ribs on the stock when ribbed stock is being stretched.

In the construction of jack shown in Fig. 4, pistons 17 within the cylinder 10 are connected by spring loaded, ball jointed connections to gripper members 18 of steel, aluminium or other suitable metal. The faces of the members 18 may be milled to improve their grip on the stock when the jacks are acting as clamping members.

The construction of jack shown in Fig. 5 differs from that shown in Fig. 3 in that the steel pistons 15 of Fig. 3 are dispensed with and the rubber or like heads 19 of the jack are shaped at their ends within the cylinder 10 to provide an effective seal when the operating pressure is applied.

To enable the jacks to be shifted manually along the stock each time the fluid pressure is removed from the jacks after each forming, clamping and stretching operation has been effected, the series of jacks is arranged within a cage member 20 comprising a pair of parallel bars 21 extending crosswise between the blocks 2 and 5, there being one such bar 21 on either side of the series of jacks 9. The cage member 20 can be slid manually on two bars 22 extending longitudinally of the machine, one on either side of the former block 2.

Automatic means may be provided to vary and control within close tolerance the magnitude of longitudinal stressing, this magnitude being determined by the rate of taper of the sheet in thickness, or in width in the case where the sheet material being formed is other than rectangular. Since strain is expressed as elongation per unit length and is independent of cross-sectional area, an extensometer or extensometers or strain gauges, positioned across the section might alternatively be attached to suitable means to measure the required elongation to stress stabilise or form the sheet or slab at each position as the loads are applied incrementally, and thereby control the tensile loads applied, and the loading sequence of the holding jacks. In the case of a rectangular sheet, pressure variation can be determined either by feedback from measurement at the point where the jacks are located, or by the distance the jacks have travelled. In the case of non-rectangular sheet tapering in thickness, both forms of measurement may be employed. Orthodox means such as oil leak-off or opposed pressure on the back of the tensioning ram may provide the means of pressure variation. Alternatively control can be effected by a cam either in the form of a figure of revolution or of lineal form, with a cam profile determined by the tension on the sheet and the cross-sectional area of the sheet at the part being stretched.

The pressure of the jacks or the pads or strips of tough resilient material or the metal blocks, as well as clamping the metal sheet or stock during stretching will also serve to form or shape the sheet on the former block so that the sheet is shaped or formed step-by-step as the jacks or other clamping means are advanced along the former block. As the stretching tension is increased, due to the increasing cross-sectional area of the part of the sheet being stretched, it may also be necessary to increase the pressure of the clamping devices. It is, however, desirable, especially in the case of lighter gauge tapered sheet, to employ the minimum tension necessary in order to prevent distortion to the formed part of the sheet, especially, for example, when a considerable radius is imposed upon the sheet.

I claim:

1. A machine for making a component of tapering cross-section by stretching and forming from aluminum and other metal stock having similar working characteristics and which stock is in the form of a sheet or slab having a cross-sectional area which varies progressively along a given dimension, comprising a holding element for application to the stock at one end of said dimension, combined forming and clamping elements including a forming block, a clamping element, supporting means for said clamping element along which the latter is movable along said dimension so as to be capable of forming and clamping the stock upon the forming block at successive positions therealong and at progressively decreasing distances from said holding element, and means causing relative movement between said combined forming and clamping elements and said holding element along said dimension to stretch the progressively reducing length of stock held by said holding element and extending between combined forming and clamping elements thereby permitting substantially equal extensions to be made to said stock per unit of length along said dimension.

2. A machine for making a component of tapering cross-section by stretching and forming from aluminum and other metal stock having similar working characteristics and which stock is in the form of a sheet or slab having a cross-sectional area which varies progressively along a given dimension, comprising a holding element for application to the stock at one end of said dimension, combined forming and clamping elements including a forming block, a clamping element comprising a plurality of stock gripping elements pivoted together side by side to constitute an articulated assembly conformable to the effective shape of the former block, supporting means for said clamping element along which the latter is movable in the direction of said dimension so as to be capable of forming and clamping the stock upon the forming block at successive positions therealong and at progressively decreasing distances from said holding element, means causing relative movement between said combined forming and clamping elements and said holding element along said dimension to stretch the progressively reducing length of stock held by said holding element and extending between said forming and clamping elements, thereby permitting substantially equal extensions to be made to said stock per unit of length along said dimension.

3. A machine for making a component of tapering cross-section by stretching and forming from aluminum and other metal stock having similar working characteristics and which stock is in the form of a sheet or slab having a cross-sectional area which varies progressively along a given dimension, comprising a holding element for application to the stock at one end of said dimension, combined forming and clamping elements including a forming block, a plurality of fluid-actuated jacks pivoted side by side to each other to constitute an articulated clamping element conformable to the shape of the former block, a fixed thrust block to take the reaction of said jacks when they are operated to form and clamp the stock upon a part of said forming block, and a support along which said articulated clamping element can be moved lengthwise of said dimension so as to be capable of forming and clamping the stock upon the forming block at successive positions therealong and at progressively decreasing distances from said holding element, and means causing relative movement between said combined forming and clamping elements and said holding element along said dimension to stretch the progressively reducing length of stock held by said holding element and extending between said forming and clamping elements, thereby permitting substantially equal extensions to be made to said stock per unit of length along said dimension.

4. A machine for making a component of tapering cross-section by stretching and forming from aluminum and other metal stock having similar working characteristics and which stock is in the form of a sheet or slab having a cross-sectional area which varies progressively along a given dimension, comprising a holding element for application to the stock at one end of said dimension, combined forming and clamping elements including a forming block, a plurality of fluid-actuated jacks pivoted side by side to each other to constitute an articulated clamping element conformable to the shape of the former block, resilient thrust elements carried at the effective ends of said jacks, a fixed thrust block to take the reaction of said jacks when they are operated to form and clamp the stock upon a part of said forming block, and a support along which said articulated clamping element can be moved lengthwise of said dimension so as to be capable of forming and clamping the stock upon the forming block at successive positions therealong and at progressively decreasing distances from said holding element, and means causing relative movement between said combined forming and clamping elements and said holding elements along said dimension to stretch the progressively reducing length of stock held by said holding element and extending between said combined forming and clamping elements, thereby permitting substantially equal extensions to be made to said stock per unit of length along said dimension.

5. A machine for making a component of tapering cross-section by stretching and forming from aluminum and other metal stock having similar working characteristics and which stock is in the form of a sheet or slab having a cross-sectional area which varies progressively along a given dimension, comprising a holding element for application to the stock at one end of said dimension, combined forming and clamping elements including a forming block, a plurality of fluid-actuated jacks pivoted side by side to constitute an articulated clamping element conformable to the shape of the forming block, and each of said jacks comprising a cylinder, a piston within each end of said cylinder, and a resilient thrust element operatively associated with each piston and constituting the effective ends of said jacks when said pistons are under the action of fluid pressure, a fixed thrust block to take the reaction of said jacks when they are operated to form and clamp the stock upon a part of said forming block, and a support along which said articulated clamping element can be moved lengthwise of said dimension so as to be capable of forming and clamping the stock upon the forming block at successive positions therealong and at progressively decreasing distances from said holding element, means causing relative movement between said combined forming and clamping elements and said holding element along said dimension to stretch the progressively reducing length of stock held by said holding element and extending between said forming and clamping elements, thereby permitting substantially equal extensions to be made to said stock per unit of length along said dimension.

References Cited in the file of this patent

UNITED STATES PATENTS

| | | |
|---|---|---|
| 1,156,062 | Crellin | Oct. 12, 1915 |
| 1,431,175 | Ogden | Oct. 10, 1922 |
| 2,154,149 | Chambers | Apr. 11, 1939 |
| 2,200,133 | Mandl | May 7, 1940 |
| 2,269,549 | Oeckl | Jan. 13, 1942 |
| 2,334,520 | Walters | Nov. 16, 1943 |

(Other references on following page)

UNITED STATES PATENTS

| | | |
|---|---|---|
| 2,379,658 | Saunders | July 3, 1945 |
| 2,429,062 | Johansen | Oct. 14, 1947 |
| 2,431,173 | Hawkes | Nov. 18, 1947 |
| 2,446,089 | Hochreiter | July 27, 1948 |
| 2,455,664 | Ferguson | Dec. 7, 1948 |
| 2,714,917 | Siegerist | Aug. 9, 1955 |
| 2,742,076 | Klein | Apr. 17, 1956 |

FOREIGN PATENTS

| | | |
|---|---|---|
| 846,386 | Germany | Aug. 11, 1952 |